Oct. 3, 1939.       G. W. SPIKINGS, JR       2,174,952
CARPENTER'S HORSE OR TRESTLE
Filed Jan. 6, 1939       3 Sheets-Sheet 1
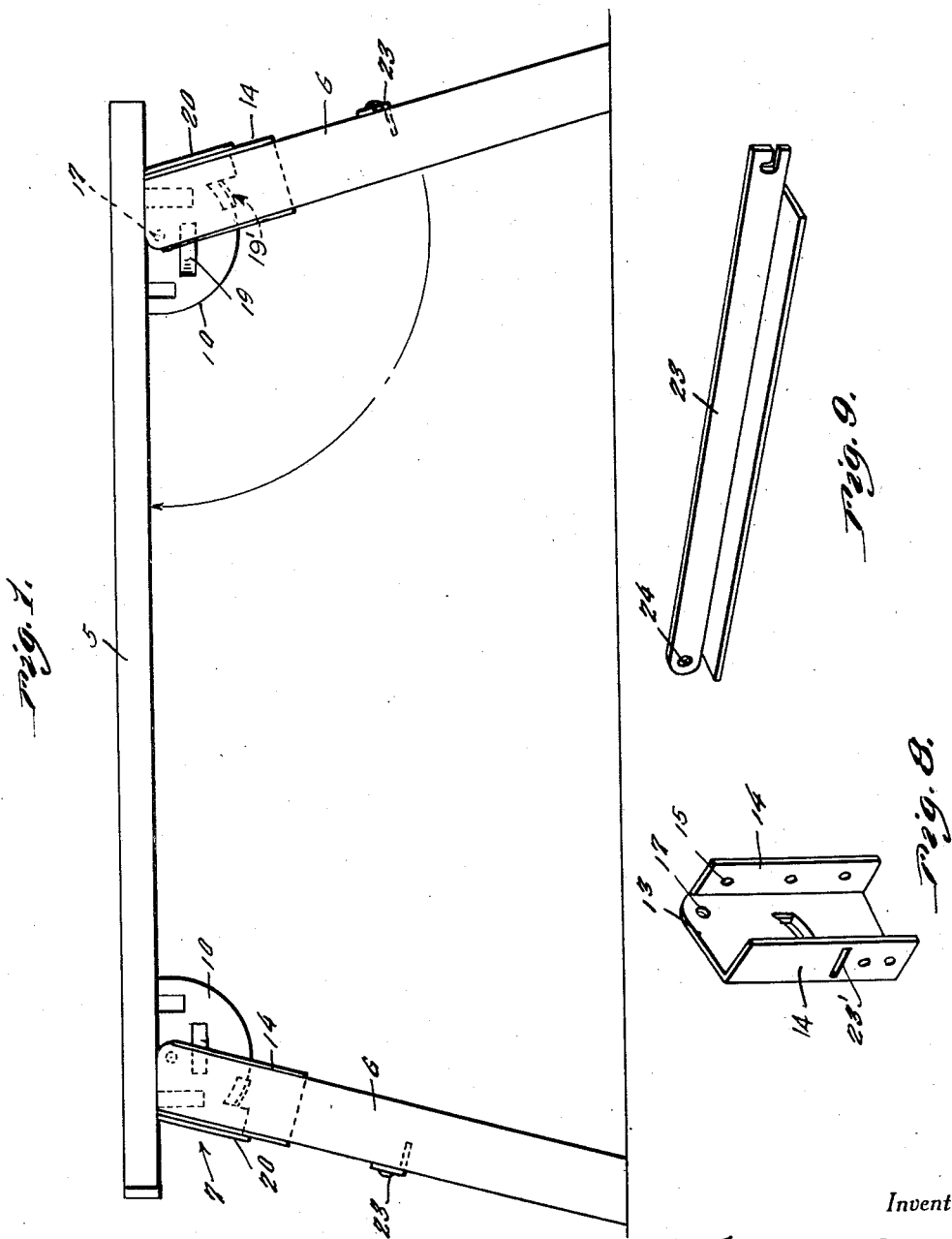
Inventor
G. W. Spikings, Jr.
By Clarence A. O'Brien
Hyman Berman
Attorneys Oct. 3, 1939.  G. W. SPIKINGS, JR  2,174,952
CARPENTER'S HORSE OR TRESTLE
Filed Jan. 6, 1939   3 Sheets-Sheet 2
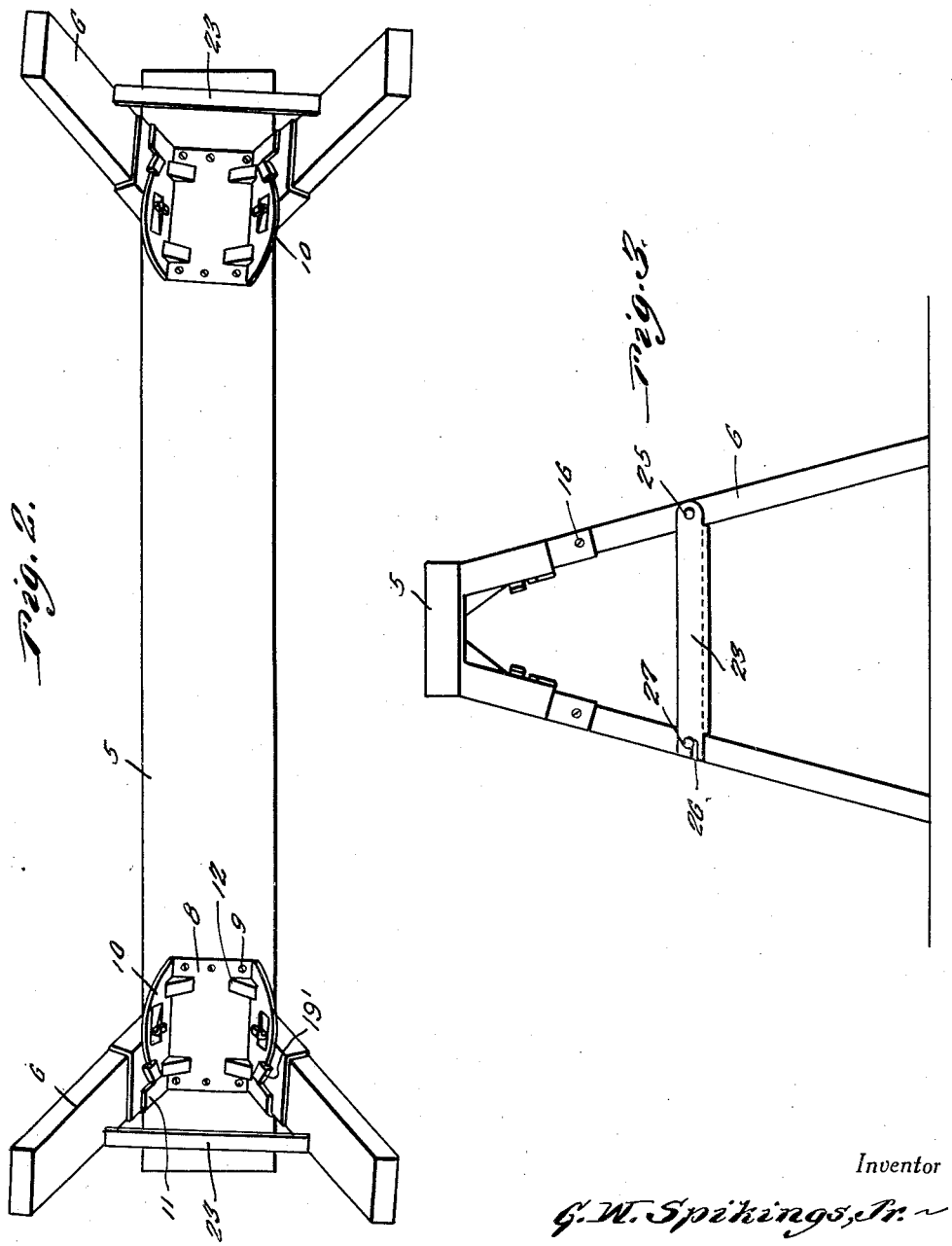
Inventor
G. W. Spikings, Jr.
By Clarence A. O'Brien
Hyman Berman
Attorneys Oct. 3, 1939.  G. W. SPIKINGS, JR  2,174,952
CARPENTER'S HORSE OR TRESTLE
Filed Jan. 6, 1939  3 Sheets-Sheet 3

Inventor
G. W. Spikings, Jr.

By Clarence A. O'Brien
Hyman Berman
Attorneys

Patented Oct. 3, 1939

2,174,952

UNITED STATES PATENT OFFICE 2,174,952

CARPENTER'S HORSE OR TRESTLE

George W. Spikings, Jr., Chicago, Ill.

Application January 6, 1939, Serial No. 249,641

2 Claims. (Cl. 304—5)

This invention relates to horses or trestles of the type commonly used by carpenters or other persons engaged in building constructions, and an object of the invention is to provide a collapsible horse of this nature embodying, generally, new and useful improvements over known types of such horses or trestles.

The invention together with its objects and advantages will be best understood from a study of the following description taken in connection with the accompanying drawings wherein:

Figure 1 is a side elevational view of the horse or trestle,

Figure 2 is a bottom plan view thereof,

Figure 3 is an end view of the horse or trestle,

Figure 5:
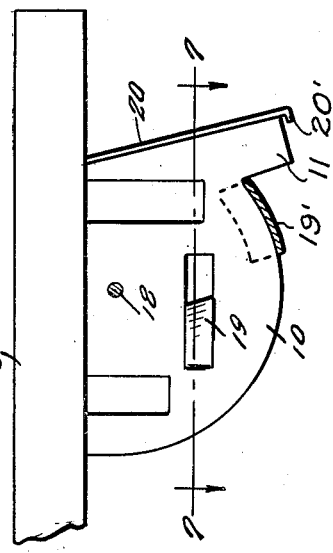
Figure 7:
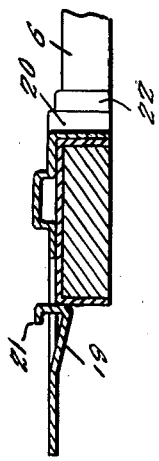
Figure 4:
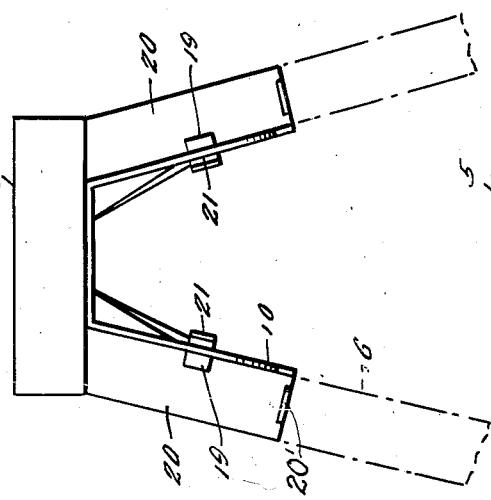
Figure 6:
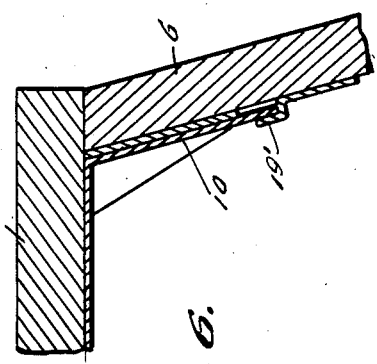

Figure 4 is an elevational view of a bracket structure hereinafter more fully referred to, Figure 5 is a side elevational view of a bracket, Figure 6 is a fragmentary detail sectional view illustrating certain details hereinafter more fully referred to, Figure 7 is a detail sectional view taken substantially on the line 7—7 of Figure 5, Figure 8 is a perspective view of a leg plate, and Figure 9 is a perspective view of a cross brace.

Referring to the drawings by reference numerals it will be seen that in accordance with the present invention the builder's horse or trestle comprises a board or beam 5, two pairs of legs, the legs of each pair being indicated by the reference numeral 6, and a bracket structure 7 for pivotally securing each pair of legs to the beam or board 5 adjacent one end of the latter.

Since the manner of connecting the legs to the beam 5 at each end is identical, and the brackets 7 are identical, a detailed description of one will teach the structure of the other.

Thus it will be seen that each bracket assembly 7 comprises a substantially U-shaped bracket having a main body plate 8 bolted or otherwise secured as at 9 to the beam 5 and provided at opposite side edges thereof with inclined flanges 10 that are substantially segmental in edge contour. Each flange 10 is formed at one end thereof to provide an integral stop 11.

The flanges 10 are braced with respect to the body plate 8 through the medium of brace elements 12 pressed out or otherwise formed integrally with plate 8 and flanges 10.

Also for each leg 6, which is preferably formed of wood, there is provided a channel member 13 that straddles the upper end portion of the leg 6. The member 13 is provided with flanges 14 having apertures 15 for receiving suitable fastening elements 16 through the medium of which the channel member is secured to a leg 6.

At an upper corner thereof the web or body portion of the channel member 13 is provided with a pivot hole 17 to accommodate a pivot 18 through the medium of which the leg is pivoted to a bracket flange 10 to swing relative to the beam or board 5 as indicated in Figure 1.

Also the leg plate 13 has struck out from the web thereof a bent lip 19' to engage the arcuate edge of the associated flange 10 for guiding the leg 6 in its swinging movement.

Each flange 10 also has struck out therefrom a spring latch 19 adapted to engage an edge of a leg 6 and to cooperate with a flange 20 on one edge of the associated flange 10 for releasably securing the leg 6 in the operative or supporting position shown in Figure 1.

To facilitate retraction of the spring latch 19 to permit the leg 6 to swing to a folded position relative to the board or beam 5 said spring latch 19 at its free end is provided with a hook-shaped formation 21.

One of the flanges 14 of the channel member 13 is provided with a transverse slot 23' for receiving the hook 20' formed on the lower end of flange 20, see Figure 5, to positively assure a securing of the leg in the supporting position.

Also, the legs of each pair are braced relative to one another through the medium of an angle iron brace 23. Brace 23 is provided at one end as at 24 with an aperture to receive a pivot pin through the medium of which the brace 23 is pivoted to one leg of said pair, while at the free end thereof the brace 23 is provided with a bayonet slot 26 cooperable with a headed stud 27 on the other leg of said pair for securing the brace to the second mentioned leg with one flange of the brace disposed between the legs in a manner to insure efficient bracing of the legs and as will be clear from a study of Figures 2 and 3.

It will be seen that with a structure of this character the legs may be readily swung to folded and unfolded positions relative to the beam 5 of the horse or trestle.

It is thought that a clear understanding of the construction, utility and advantages of a builder's workhorse or trestle embodying the features of the present invention will be had without a more detailed description thereof.

Having thus described the invention what is claimed as new is:

1. A trestle of the character described comprising an elongated board member, an inverted U-shaped bracket secured to the underside of the board member adjacent each end of the latter, a pair of channel members pivoted at one end to the side flanges of each U-shaped bracket, legs having their upper ends fastened in the channel members the flanges of each U-shaped bracket being also provided at one end edge thereof with inclined flanges against which the channel members abut when the legs are swung to a supporting position, and spring latches carried by the flanges of the respective U-shaped brackets and engageable with the channel members of the legs at the edges thereof opposite to said inclined flanges for cooperation with the latter to releasably secure the legs in supporting position, one flange of each channel member having a slot therein and a lateral projection on each inclined flange for engaging the slot when the leg is in supported position.

2. A trestle of the character described comprising an elongated board member, an inverted U-shaped bracket secured to the underside of the board member adjacent each end of the latter, a pair of legs pivoted at one end to the side flanges of each bracket, the flanges of each bracket being also provided at one end edge thereof with inclined flanges against which the legs abut when swung to a supporting position, and spring latches carried by the flanges of the respective brackets and engageable with the legs at the edges thereof opposite to said inclined flanges for cooperation with the latter to releasably secure the legs in supporting position, and each leg also having on one side thereof a guide member engaging an edge portion of the side flange of the bracket, and each side flange of said bracket having an integral abutment with which said guide member abuts when the leg is swung to a supporting position.

GEORGE W. SPIKINGS, Jr.